United States Patent

Webb

[15] 3,642,530
[45] Feb. 15, 1972

[54] METHOD FOR FORMING AN ELECTRICALLY INSULATING COATING

[72] Inventor: Alan E. Webb, Bristol, England
[73] Assignee: Rolls-Royce Limited, Derby, England
[22] Filed: Nov. 17, 1969
[21] Appl. No.: 877,458

[30] Foreign Application Priority Data

Nov. 20, 1968 Great Britain ...................55,090/68

[52] U.S. Cl. .........................117/217, 117/71 M, 117/75, 117/218, 117/227, 117/230, 117/232
[51] Int. Cl. ...........................................B44d 1/09, B44d 1/16
[58] Field of Search................117/217, 218, 227, 230, 232, 117/71 M, 75

[56] References Cited

UNITED STATES PATENTS

| | | | |
|---|---|---|---|
| 2,878,141 | 3/1959 | Canniff | 117/71 M |
| 2,941,981 | 6/1960 | Elbling et al. | 117/232 X |
| 2,994,623 | 8/1961 | Saxon | 117/232 |
| 2,997,776 | 8/1961 | Matter et al. | 117/230 X |
| 3,038,823 | 6/1962 | Currant et al. | 117/227 |

OTHER PUBLICATIONS

J. Delmonte, *Metal-Filled Plastics*, N.Y., Reinhold, 1961, chapter 5, pp. 82-85

*Primary Examiner*—Alfred L. Leavitt
*Assistant Examiner*—C. K. Weiffenbach
*Attorney*—E. J. Berry and L. Rosen

[57] ABSTRACT

Processes are described for forming electrically insulating coatings and which comprise applying an epoxy coating containing a thixotropic filler and oxide pigment and applying over this an epoxy coating containing a thixotropic filler, an oxide pigment and a powder of inert metal.

9 Claims, No Drawings

METHOD FOR FORMING AN ELECTRICALLY INSULATING COATING

It is often desirable to provide a metal with an electrically insulating coating which has good adhesion to the metal, high-mechanical strength e.g., impact resistance, and good corrosion resistance. One occasion when coatings having these properties are of value is when the metal is to be used as the insulated electrode in electrochemical machining.

In electrochemical machining a potential difference is applied between the work piece and an electrode having a bore through which electrolyte is directed on to the workpiece. The electrode serves as a tool and the shape of the outlet of the bore determines the machining operations that can be effected by a particular electrode. Part of the electrode must be insulated and the conditions of use of the electrode necessitate the use of insulation having strong adhesion to the metal of the electrode.

Existing insulating coatings are not altogether satisfactory either in respect of their properties or else in their cost or ease of application or both and it has been our object to devise an improved insulating coating.

According to the invention an insulating coating is formed by a method which comprises applying to the surface of the metal to be insulated a first coating comprising an epoxy resin, a hardener, a thixotropic filler and an oxide pigment and gelling this coating, and applying over the first coating a second coating comprising an epoxy resin, a hardener, a thixotropic filler, an oxide pigment and a powder of an inert metal, and gelling this coating and curing the composite coating on the metal surface. The method may simply comprise applying the two coatings described, but generally more than two coatings are applied. Thus, for example, more than one coating is generally applied over the said first coating.

It is naturally necessary to take appropriate steps to ensure that optimum adhesion of the insulating coating to the metal surface is achieved. Thus the metal surface must be a clean suitably keyed surface.

Thus it is normal to clean the metal surface, for example by grit blasting followed by degreasing by, for example, vapor degreasing using trichloroethylene. Alternatively the surface may first be degreased and then etched with a suitable etching solution.

With some metals, for example copper and copper based alloys, it is highly desirable to apply a primer coating to the metal before applying the said first coating, and other metals may also be primed. Primers that are suitable for different metals are well known and a wide variety of primers can be used, their choice depending upon the metal. For example phenolic/polyamide primers may be used. Such a primer that is particularly suitable for copper and copper based alloys (which are the preferred metals in the invention since electrodes for electro chemical machining are commonly made of copper) is available from CIBA (A.R.L.) Limited under the name X83/65 or DZ80. It may be desirable to abrade the primed surface lightly before applying the said first coating.

A wide variety of epoxy resins may be used in the coatings but the diglycidyl ether of Bisphenol A (namely Bisphenol/Epichlorohydrin epoxide) has been found particularly satisfactory. Others that may be used are epoxides made by epoxidation of olefins by peracetic acid. The hardeners used with the epoxy resins are conventional ones such as the aromatic amine type hardeners e.g., 4,4'-diaminodiphenyl methane, and anhydride hardeners. They are used in conventional amounts e.g., 25 to 30 parts per 100 parts resin.

The epoxy resins are, as stated above, used in conjunction with a thixotropic filler and certain commercially available epoxy resins include such a filler and may conveniently be used.

The thixotropic filler prevents the coating composition running off the surface during application, and the amount used should be such to give this property. A suitable filler is bentone. Finely divided vapor deposited silica, such as that known by the name Aerosil may be used, as also may Cab-o-Sil. Suitable Aerosil may have a particle size of between 100 mesh and dust with, for example, 1% + 100, 30% − 100 + 200, 50% − 200 + 350, residue −350. All mesh sizes herein are B.S.S.

The oxide pigment in the coating is finely divided and acts as a filler. Preferably it is not greater then 300 mesh. Examples include chromium sesquioxide, aluminum oxide and titanium dioxide, the last being preferred. The oxide pigment modifies the physical properties of the coatings and, in particular, renders them more convenient to apply. In the second coating the oxide pigment also assists the dispersion of the metal powder. The oxide pigment selected should be substantially inert, that is to say it should be inert under the circumstances in which the coated metal is to be used. Thus it should be inert to the ingredients of the coatings and also to the conditions to which the coated article is liable to be subjected, although the pigment will be protected to some extent at least by the epoxide resin of the coating. Thus when the coated article is to be used as an electrode for electrochemical machining the oxide pigment must be one that is inert to the electrolyte employed.

The inert metal powder used in the second coating may be a powdered elementary metal or a powdered alloy. Preferably it is not greater than 200 mesh (i.e., −200 to dust). Examples of suitable inert metals include nickel, chromium, titanium, and stainless steel, stainless steel being preferred because of the excellent impact resistance it imparts to the coating, and because of its excellent corrosion resistance. Again, the powder must be inert both to the ingredients of the coating and the conditions to which the coated article is liable to be subjected. Thus, again, if the article is to be used in electro chemical machining the metal powder should be inert to the electrolyte.

The coating that is applied over the said first coating preferably contains, in addition to the ingredients already mentioned, an inorganic filler such as mica flour or natural vermiculite. These materials have a laminar structure and their inclusion modifies the structure of the gelled or cured coating and, in conjunction with the thixotropic filler, decreases the tendency of the epoxy resin to flow. Inert fibrous material can be used for the same purpose. Preferably the particle size is between 100 mesh and dust. A satisfactory grade of mica has 30% − 100 + 120 mesh, 40% − 120 + 200 mesh, 30% − 200 + 400 mesh.

It is usually necessary to subject the coated surface to surface machining to improve the finish and the inclusion of such fillers, preferably mica, is advantageous in that it renders the article particularly readily machinable. Thus it is particularly preferable that the outermost coating on an article to be machined preferably contains one of these fillers. Thus if two coatings are being applied over the said first coating then it is particularly desirable that the last coating, i.e., the third coating, should contain mica or one of the other fillers. Normally it is preferred that the second coating as well contains such a filler.

Irrespective of whether a single coating or more than one coating is applied over the said first coating it is preferred, if surface machining has been used, to apply a final sealing coating, generally of a similar composition to the composition of the said first coating, to the machined surface. In such cases the machined surface should be first cleaned by an appropriate degreasing operation followed by heating to remove residual solvent prior to application of this final sealing coating.

In the method of the invention it is desirable to apply the said second coating as quickly as possible after completing the gelling of the said first coating. Similarly, in a three-coat process, the third epoxy coating should be applied as quickly as possible after gelling of the second. Thus, in general it is desirable to apply each within 5 minutes of completing the gelling of the preceding coating. Normally each preceding epoxy coating is still slightly tacky when the next is applied to it. If the coating is to be machined, before machining the coating is normally gelled until it is tack free.

After the application of the final coating the composite coating, i.e., the coating made up from the various individual coatings applied to the article, is preferably baked to achieve adequate curing, e.g., by heating the coated article in an oven for at least 12 hours at 80° C.

In the following examples range of compositions for the various coating mixtures are given for certain specific ingredients and three specific coating mixtures which we have found particularly satisfactory for insulating a copper electrode for electrochemical machining are also given.

First Coating Mixture

| | |
|---|---|
| Diglycidyl ether of Bisphenol A | 100 parts by wt. |
| Thixotropic filler | 2–7 parts by wt. |
| 4,4′ diaminodiphenyl methane (CIBA HT 972 HARDENER) | 27–30 parts by wt. |
| Titanium dioxide powder (−300 B.S.S. mesh) | 20–40 parts by wt. |

Second Coating Mixture

| | |
|---|---|
| Diglycidyl ether of Bisphenol A | 100 parts by wt. |
| Thixotropic filler | 2–7 parts by wt. |
| 4,4′ diaminodiphenyl methane | 27–30 parts by wt. |
| Titanium dioxide (−300 B.S.S. mesh) | 25–80 parts by wt. |
| Stainless steel powder (−200 B.S.S. mesh) | 20–120 parts by wt. |
| Mica flour | 8–50 parts by wt. |

These mixtures are useful both for processes in which just the said first and second epoxy coatings are applied and also for processes in which the said third coatings are applied. However in these latter processes the second and third coating mixtures preferably differ slightly and suitable mixtures are given below.

Second Coating Mixture

| | |
|---|---|
| Diglycidyl ether of Bisphenol A | 100 parts by wt. |
| Thixotropic filler | 2–7 parts by wt. |
| 4,4′ diaminodiphenyl methane | 27–30 parts by wt. |
| Titanium dioxide (−300 B.S.S. mesh) | 20–120 parts by wt. |
| Stainless steel powder (−200 B.S.S. mesh) | 20–120 parts by wt. |
| Mica flour | 8–20 parts by wt. |

Third Coating Mixture

| | |
|---|---|
| Diglycidyl ether of Bisphenol A | 100 parts by wt. |
| Thixotropic filler | 2–7 parts by wt. |
| 4,4′ diaminodiphenyl methane | 27–30 parts by wt. |
| Titanium dioxide (−300 B.S.S. mesh) | 45–80 parts by wt. |
| Stainless steel powder (−200 B.S.S. mesh) | 40–80 parts by wt. |
| Mica flour | 20–50 parts by wt. |

In these mixtures the hardener may be replaced by the same amount of another hardener, the titanium dioxide by the same amount of another inert metal oxide, the mica by the same amount of another lamina or fibrous filler and the stainless steel powder by the same amount of another inert metal powder.

The following are specific examples of compositions for first, second and third coating mixtures.

First Coating Mixture A

| | |
|---|---|
| Ciba MY 750 Resin | 50 parts by wt. |
| Ciba SV 409 Resin | 55 parts by wt. |
| Ciba HT 972 Hardener | 27 parts by wt. |
| Titanium Dioxide | 25 parts by wt. |

Second Coating Mixture B

| | |
|---|---|
| Ciba MY 750 Resin | 50 parts by wt. |
| Ciba SV 409 Resin | 55 parts by wt. |
| Ciba HT 972 Hardener | 27 parts by wt. |
| Titanium Dioxide | 25 parts by wt. |
| Stainless steel powder | 75 parts by wt. |
| Mica flour | 10 parts by wt. |

Third Coating Mixture C

| | |
|---|---|
| Ciba MY 750 Resin | 50 parts by wt. |
| Ciba SV 409 Resin | 55 parts by wt. |
| Ciba HT 972 Hardener | 27 parts by wt. |
| Titanium dioxide | 50 parts by wt. |
| Stainless steel powder | 75 parts by wt. |
| Mica flour | 25 parts by wt. |

Ciba MY 750 and Ciba SV 409 are the diglycidyl ether of Bisphenol A. The mixture of resins used included thixotropic filler in an amount of about 5 percent based on their total weight. Ciba HT 972 hardener is 4,4′-diaminodiphenyl methane.

In one particular method according to the invention a copper piece was cleaned by grit blasting followed by vapor degreasing in trichloroethylene and then had brushed onto it a primer coat of the copper primer sold by CIBA (A.R.L.) Limited as X83/65. The solvent was then removed by stoving for 30 minutes at 80° C. and the primer was then fully cured at 150° C. for 30 minutes. The first coating mixture, A, was brushed onto the primed surface, after the latter had been lightly abraded with fine emery paper, at 60° C. to form a coating 0.005 inches thick. This coating was gelled at 80° C. for 90 minutes and the second coating mixture, B, was immediately brushed onto the surface which still retained some tack. The second coating was 0.015–0.020 inches thick and was gelled for 90 minutes at 80° C. The third coating mixture, C, was then immediately spread coated onto the coated article with a knife, the surface still being slightly tacky, to give a total coating thickness of 0.060–0.080 inches. After gelling at 80° C. for 120 minutes until tack free the coated article was dry machined or filed to produce a coating having a desired surface finish and shape. The surface was then degreased by swabbing with 1,1,1, trichloroethylene, the solvent evaporated off by heating to 60° C., and a sealing coating of the first coating mixture A was immediately applied by brushing. The entire coating was then fully cured for 12 hours at 80° C. The total thickness of the insulating coating applied was 0.060 inches.

It was found that the resultant coating had very good adhesion to the metal, had very high mechanical strength and very good corrosion resistance.

I claim:

1. A method of forming an electrically insulating coating on a metal surface which comprises applying to the surface a primer coating, applying over the primer coating a first epoxy coating comprising epoxy resin, hardener, 2 to 7 parts by weight thixotropic filler and 20 to 40 parts by weight oxide pigment, per 100 parts resin, and gelling said first coating, applying over said first coating a second epoxy coating comprising epoxy resin, hardener, 2 to 7 parts by weight thixotropic filler, 20 to 120 parts by weight oxide pigment, 8 to 20 parts by weight laminar or fibrous filler, per 100 parts by weight resin, and gelling said second coating, applying over said second coating a third epoxy coating comprising epoxy resin, hardener, 2 to 7 parts by weight thixotropic filler, 45 to 80 parts by weight oxide pigment, 40 to 80 parts by weight inert metal powder and 20 to 50 parts by weight laminar or fibrous filler, per 100 parts by weight resin, and gelling said third coating, and curing the coatings on the surface.

2. A method according to claim 1 in which the laminar or fibrous filler is mica.

3. A method according to claim 1 in which the metal powder is stainless steel powder.

4. A method according to claim 1 in which the oxide pigment is titanium dioxide powder.

5. A method according to claim 1 in which the metal surface is degreased before the said primer coating is applied.

6. A method according to claim 5 in which the metal surface is of copper or of copper based alloy.

7. A method according to claim 1 in which the epoxy resin is the diglycidyl ether of Bisphenol A.

8. A method according to claim 1 in which, after gelling the third epoxy coating but before curing, said third epoxy coating is machined and in which, after said machining but before curing, a sealant coating is applied, said sealant coating comprising epoxy resin, hardener, 2 to 7 parts by weight thixotropic filler and 20 to 40 parts by weight oxide pigment, per 100 parts by weight resin.

9. A method according to claim 8 in which each of said first, second and third epoxy coatings and said sealant 27 to 30 parts by weight amine hardener per 100 parts by weight epoxy resin.

* * * * *